United States Patent
Cozine et al.

(10) Patent No.: US 7,735,305 B1
(45) Date of Patent: Jun. 15, 2010

(54) REMOVABLE COVER AND IMPLEMENT INCORPORATING SAME

(75) Inventors: Mark L. Cozine, Valley Center, KS (US); Robert A. Ostdiek, Beatrice, NE (US); David M. Converse, Lincoln, NE (US); Joseph J. Oliver, Lincoln, NE (US)

(73) Assignee: Exmark Manufacturing Company, Incorporated, Beatrice, NE (US)

( * ) Notice: Subject to any disclaimer, the term of this patent is extended or adjusted under 35 U.S.C. 154(b) by 0 days.

(21) Appl. No.: 12/413,831

(22) Filed: Mar. 30, 2009

(51) Int. Cl.
*A01D 34/00* (2006.01)
(52) U.S. Cl. .................................................... 56/17.4
(58) Field of Classification Search .............. 56/17.4, 56/320.2, 12.7; 30/276
See application file for complete search history.

(56) References Cited

U.S. PATENT DOCUMENTS

| | | | |
|---|---|---|---|
| 2,906,223 A | | 9/1959 | Goosman |
| 4,660,362 A | * | 4/1987 | Klinner ....................... 56/364 |
| 4,793,457 A | | 12/1988 | Siewert et al. |
| 5,195,309 A | * | 3/1993 | Mossman ..................... 56/119 |
| 5,601,504 A | * | 2/1997 | Rocca et al. ................... 474/91 |
| 5,865,019 A | * | 2/1999 | Hurlburt et al. ............... 56/119 |
| 5,881,464 A | * | 3/1999 | Collins et al. ................. 30/276 |
| 5,957,796 A | | 9/1999 | McLean |
| 6,143,230 A | * | 11/2000 | Andrios et al. .............. 264/306 |
| 6,247,297 B1 | * | 6/2001 | Becker ......................... 56/119 |
| 6,418,627 B1 | * | 7/2002 | Tsunoda et al. ............... 30/347 |
| 6,823,655 B2 | | 11/2004 | Underhill et al. |
| 7,111,403 B2 | * | 9/2006 | Moore ........................ 30/276 |
| 7,134,208 B2 | * | 11/2006 | Wilkinson et al. ............ 30/276 |
| 7,610,742 B2 | * | 11/2009 | Imanishi et al. ............ 56/320.2 |
| 2007/0236069 A1 | * | 10/2007 | Chung ........................ 297/408 |

OTHER PUBLICATIONS

"Removing Belt Shields," [online]. Section excerpt from John Deere Operator's Manual No. OMTCU26008, Issue B9 Z-Trak™ Pro Series Z810A, Z820A, Z830A, Z840A, Z850 Pin (014001-) Z860A PIN(010001-), Operator's Manual, North American Version. Retrieved from Internet:<URL:http://manuals.deere.com/cceomview/OMTCU26008_B9/Output/Index.html?tM=HO>; 1 pg. Retrieved on Jun. 10, 2009.
Two pictures of belt shield for John Deere Product ID No. TC830AP010295, Model Z-Trak Pro Z830A, 27 HP, 60" Deck, available at least as early as Mar. 17, 2008; 1 pg.

\* cited by examiner

*Primary Examiner*—Árpád Fábián-Kovács
(74) *Attorney, Agent, or Firm*—Mueting, Raasch & Gebhardt, P.A.

(57) ABSTRACT

A removable cover for attachment to a structure such as a housing. In one embodiment, the cover extends over a mechanical drive system of an implement. The exemplary cover may be used to shield a driven pulley and at least a portion of an associated belt of a lawn mower cutting deck when the cover is attached to the deck. The cover may, at one end, include one or more portions configured to engage the housing. At a second end, the cover may include a resilient lip that, at least in one embodiment, is defined by an opening formed in the cover. The lip may selectively interlock with an anchor attached to the housing to secure the cover relative to the deck.

13 Claims, 7 Drawing Sheets

REMOVABLE COVER AND IMPLEMENT INCORPORATING SAME

TECHNICAL FIELD

The present invention relates generally to a cover and, more particularly, to a removable cover or shield for attachment to a structure (e.g., such as a cutting deck of a riding lawn mower), and to implements incorporating the same.

BACKGROUND

Mechanically driven systems such as belt drive systems are commonly used to transmit power between a power source such as an engine and a separate device or implement. For instance, motorized riding vehicles such as lawn mowers may support, among other implements, a cutting deck. The deck, which is typically mounted in front of, behind, to the side, or beneath the vehicle frame, may form a housing defined by a horizontal upper surface and integral, downwardly extending side skirts. One or more vertical spindles may be journalled to the upper surface of the cutting deck such that a cutting blade may be attached to a lower end of the spindle. Rotation of the spindle thus results in corresponding rotation of the cutting blade.

Typically, each spindle passes through an opening in the upper surface of the deck such that an upper end of the spindle extends above the housing and has attached thereto a driven spindle sheave. One or more belts may be routed about the spindle sheave(s) as well as about a driving sheave, the latter operatively powered by the vehicle engine. When sufficiently tensioned, the belt may thus transmit rotational power from the engine to the cutting blades.

To at least partially enclose the moving belt and spindle sheave, a cover or shield may be provided. The cover may attach to the upper surface of the deck be configured to extend over the rotating spindle sheave and portions of the belt that may otherwise be exposed.

To ensure that the belt cover remains in its desired position and does not shift out of place (e.g., into contact with the belt or spindle sheave), it may be fastened to the deck. However, the cover is preferably also configured to be removable so as to permit access to the belt/sheave, e.g., for cleaning and maintenance. Some known techniques for removably securing the cover to the deck include the use of nuts, bolts, clips, and other removable fasteners.

While effective, the use of removable fasteners presents drawbacks. For example, the need to remove fasteners may result in loss or misplacement of the same. Moreover, depending on the frequency of cover removal (e.g., it is not uncommon in the commercial mowing environment to remove the deck belt cover(s) one or more times per day for cleaning), the amount of time necessary to remove the fasteners and cover may be perceived as excessive, and the need to carry fastener removal tools undesirable.

SUMMARY

The present invention may overcome these and other issues with prior art mowers by providing, in one embodiment, a ground working implement including a housing having an anchor, and a removable cover that securely attaches to, and shields a portion of, the housing when the cover is in a secured position. The cover includes: one or more contact portions each configured to mechanically engage a corresponding receiving portion of the housing; and a resilient lip defined by an edge of an opening formed in the cover. The lip is configured to selectively interlock with the anchor of the housing when the cover is in a secured position.

In another embodiment, a ground working implement is provided. The implement includes: a housing having an anchor; a shaft extending through the housing and journalled thereto for rotation of the shaft relative to the housing; a mechanical drive member operatively coupled to a first end of the shaft; and a removable cover to shield a portion of the mechanical drive member when the cover is in a secured position. The cover includes: a contact portion configured to engage a receiving portion of the housing; and a resilient lip defined by an edge of an opening formed in the cover, the lip configured to selectively interlock with the anchor of the housing when the cover is in the secured position.

In yet another embodiment, a lawn mower cutting deck is provided and includes a housing; a shaft extending through the housing and journalled thereto for rotation of the shaft relative to the housing; a coupler attached to an upper end of the shaft; a cutting blade attached to a lower end of the shaft; and a mechanical drive member connected to the coupler. Also included is an anchor attached to an upper surface of the housing, and a removable cover that, when in a secured position, attaches to the housing to shield the coupler and at least a portion of the mechanical drive member. The cover includes one or more tabs proximate a first end of the cover, each of the one or more tabs configured to be received in a receiving slot formed in the housing. The cover further includes a resilient lip defined by a cantilevered portion of the cover that extends into an opening formed through the cover proximate a second end of the cover. The lip is configured to selectively interlock with the anchor when each of the one or more tabs is received in its corresponding receiving slot.

The above summary is not intended to describe each embodiment or every implementation of the present invention. Rather, a more complete understanding of the invention will become apparent and appreciated by reference to the following Detailed Description of Exemplary Embodiments and claims in view of the accompanying figures of the drawing.

BRIEF DESCRIPTION OF THE VIEWS OF THE DRAWING

The present invention will be further described with reference to the figures of the drawing, wherein.

Figure 1:
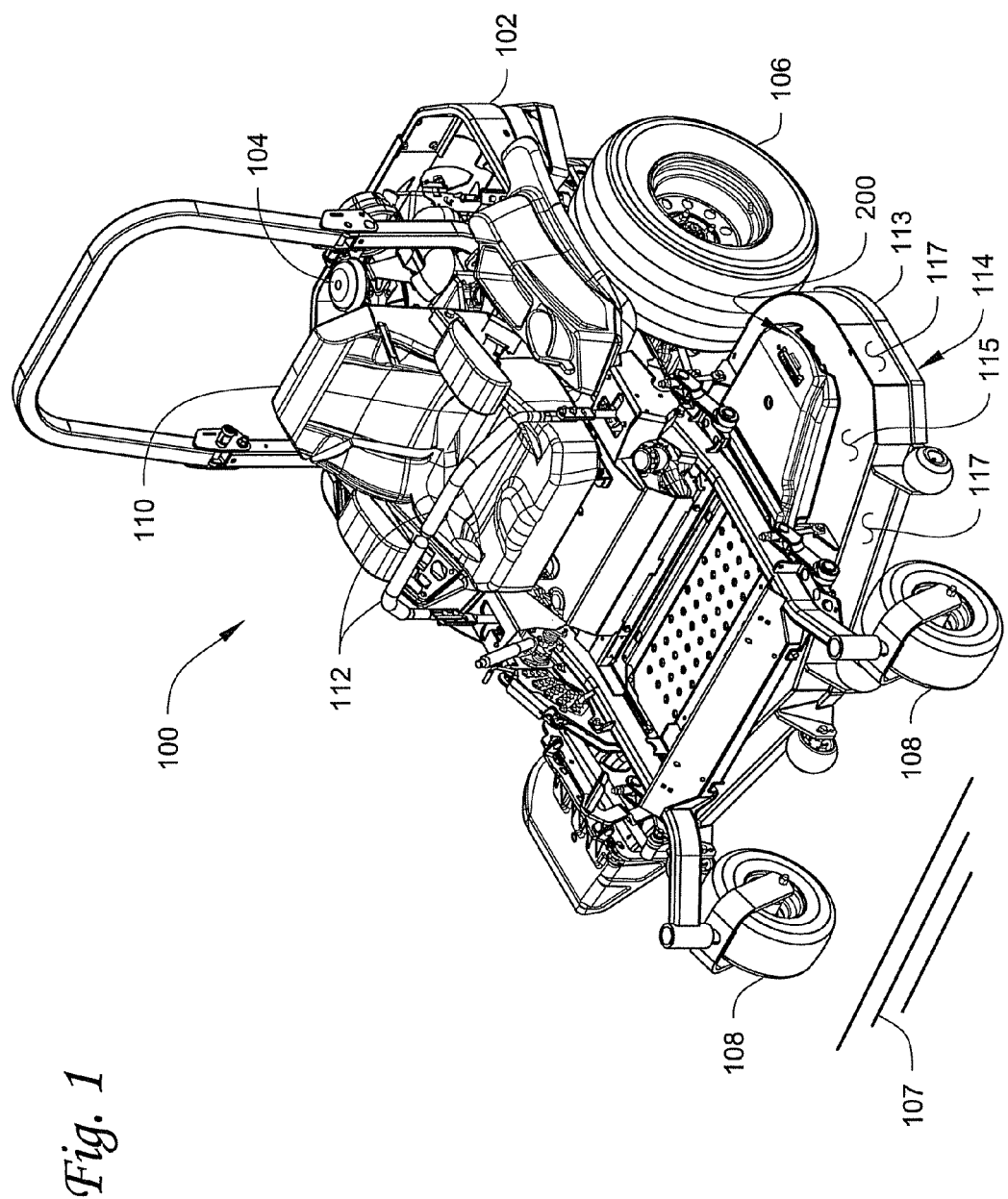
FIG. 1 illustrates a perspective view of a vehicle (e.g., a zero-radius-turning riding lawn mower) having an implement (e.g., cutting deck) incorporating two covers (e.g., belt covers; only left cover shown) in accordance with one embodiment of the invention, the belt cover shown in a secured position on, e.g., attached to, the deck.

The figures are rendered primarily for clarity and, as a result, are not necessarily drawn to scale.

DETAILED DESCRIPTION OF EXEMPLARY EMBODIMENTS

In the following detailed description of illustrative embodiments of the invention, reference is made to the accompanying figures of the drawing which form a part hereof, and in which are shown, by way of illustration, specific embodiments in which the invention may be practiced. It is to be understood that other embodiments may be utilized and structural changes may be made without departing from the scope of the present invention.

Generally speaking, embodiments of the present invention are directed to a cover for secure attachment to a structure such as a housing. In some embodiments, the cover may be used to shield or isolate a portion of the housing when the cover is in a secured position. For example, in the illustrated embodiments, the cover may shield at least a portion of a mechanical drive member such as a pulley/belt system attached to a device or implement. For brevity, embodiments of the invention will be described herein with respect to ground working implements such as grass cutting decks typically found on riding lawn mowers. Alternative embodiments of the invention may, however, find use with most any other mechanical drive system including, for example, chain drive and shaft drive systems.

FIG. 1 illustrates a vehicle incorporating a removable shield or cover 200 in accordance with one embodiment of the present invention. The cover 200 may shield a portion of a mechanical drive system (not shown). For instance, the cover may shield a mechanical coupler (such as a belt driven sheave) as well as a portion of a mechanical drive member (such as a belt) connected to the coupler. The vehicle, as shown in FIG. 1, may be configured as a zero-radius-turning (ZRT) power riding lawn mower 100. However, while described herein with respect to a ZRT mower, those of skill in the art will realize that embodiments of the present invention are equally applicable to other types of riding and walk-behind mowers, as well as to most any other type of mechanical drive system wherein isolation of a moving part from its surroundings is desired. Moreover, while described and illustrated herein as covers for shielding mechanically driven devices, such applications are not limiting. In fact, removable covers for most any application, e.g., those for placement over maintenance access areas and those provided merely for cosmetic purposes, are also contemplated within the scope of the invention.

FIG. 1 illustrates the exemplary vehicle, e.g., mower 100, having underlying structure (a mower frame or chassis 102) that supports a prime mover, e.g., internal combustion engine 104. A pair of transversely opposing, ground engaging drive members, e.g., drive wheels 106 (only left wheel visible in FIG. 1) may support the mower 100 in driving engagement with a ground surface 107. Other ground engaging members, e.g., castoring or steerable front wheels 108, may support the front of the mower as shown. Each drive wheel 106 may be powered by a hydrostatic motor (not shown) which receives power from a hydraulic pump under the control of an operator. The hydraulic pump, in turn, may be powered by the engine 104. Other wheel drive systems (e.g., mechanical systems) and drive configurations (e.g., tri-wheel) are also possible without departing from the scope of the invention. Moreover, while the mower 100 is illustrated and described herein as utilizing an internal combustion engine and hydraulic drives, other power sources and drive systems (e.g., electric motors) are also contemplated.

The mower 100 may further include a seat 110 (see FIG. 1) to accommodate an operator. Various controls, e.g., ZRT drive control levers 112, may be accessed by the operator from the seat during operation. In the illustrated embodiment, the mower 100 includes what is often referred to as a twin lever control system wherein left and right control levers 112 control, respectively, the speed and rotational direction of the left and right drive wheels 106. Accordingly, mower speed and direction may be controlled by selective manipulation of the two drive control levers 112.

An implement, e.g., cutting deck 114, may be attached, in this embodiment, generally between the front and rear wheels as shown in what is commonly referred to as a mid-mount configuration. The cutting deck 114 may form a housing 113 defined by a generally horizontal upper surface 115 and generally vertical peripheral side skirts 117 extending downwardly from the upper surface. The housing (upper surface 115 and skirts 117) of the cutting deck 114 may define a chamber 124 that houses one or more cutting blades 120 (see FIG. 7) as is known in the art.

Figure 7:
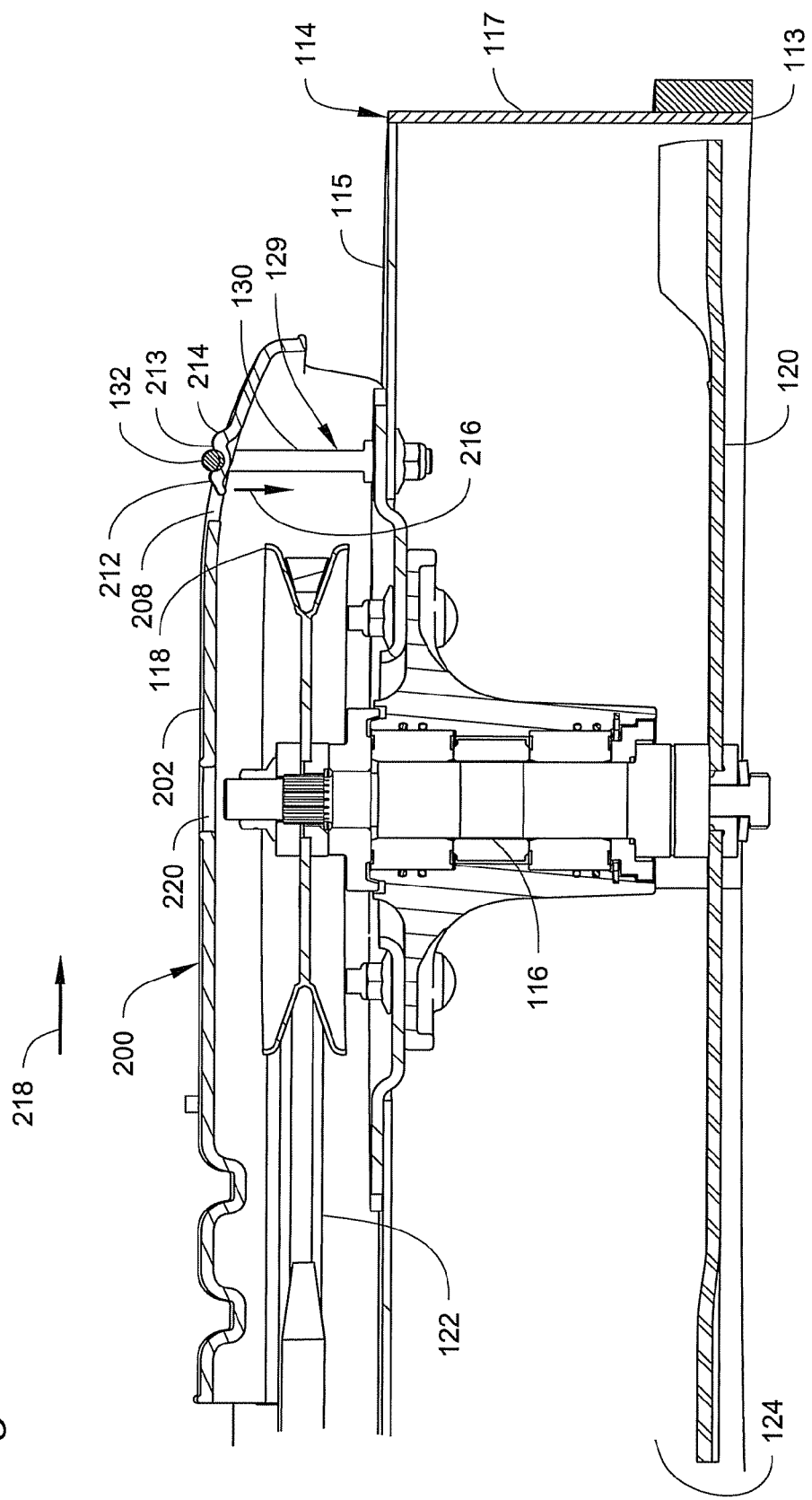
FIG. 7 is a section view taken along line 7-7 of FIG. 6.

The housing, e.g., upper surface 115, may further include an aperture through which one or more shafts or spindles 116 (see FIGS. 2 and 7) may extend through. In the illustrated embodiment, each spindle 116 is oriented generally vertically and is attached to the upper surface 115 of the deck 114 via journal bearings (such that the spindle is journalled to the deck). Such an attachment configuration restrains the spindle from generally all but rotational movement relative to the housing 113. A power coupler, e.g., driven sheave or pulley 118, may be attached to a first end (e.g., upper end) of the spindle 116. The pulley 118 may be keyed or otherwise fixed to the spindle such that rotation of the pulley results in corresponding rotation of the spindle. A cutting blade 120 may be attached to a second or lower end of each of the spindles 116 as illustrated in FIG. 7.

A mechanical drive member, e.g., endless belt 122 (see FIG. 2), may be positioned about, e.g., routed around, the pulley 118 as well as around a driving pulley (not shown) powered by the engine 104. During operation, one or more idler pulleys (also not shown) may selectively tension the belt 122 to permit delivery of power from the driving pulley of the engine to the driven pulley 118. As a result, the pulley 118, spindle 116, and cutting blade 120 may rotate at a speed sufficient to permit the blade to cut grass and other vegetation over which the deck passes.

As used herein, relative terms such as "left," "right," "fore," "forward," "aft," "rearward," "top," "bottom," "upper," "lower," "horizontal," "vertical," and the like are, if used, from the perspective of one operating the mower 100 while the mower is in an operating configuration, e.g., while the mower 100 is positioned such that the wheels 106, 108, rest upon the generally horizontal ground surface 107 as shown in FIG. 1. These terms are used herein only to simplify the description, however, and not to limit the scope of the invention in any way.

Figure 2:
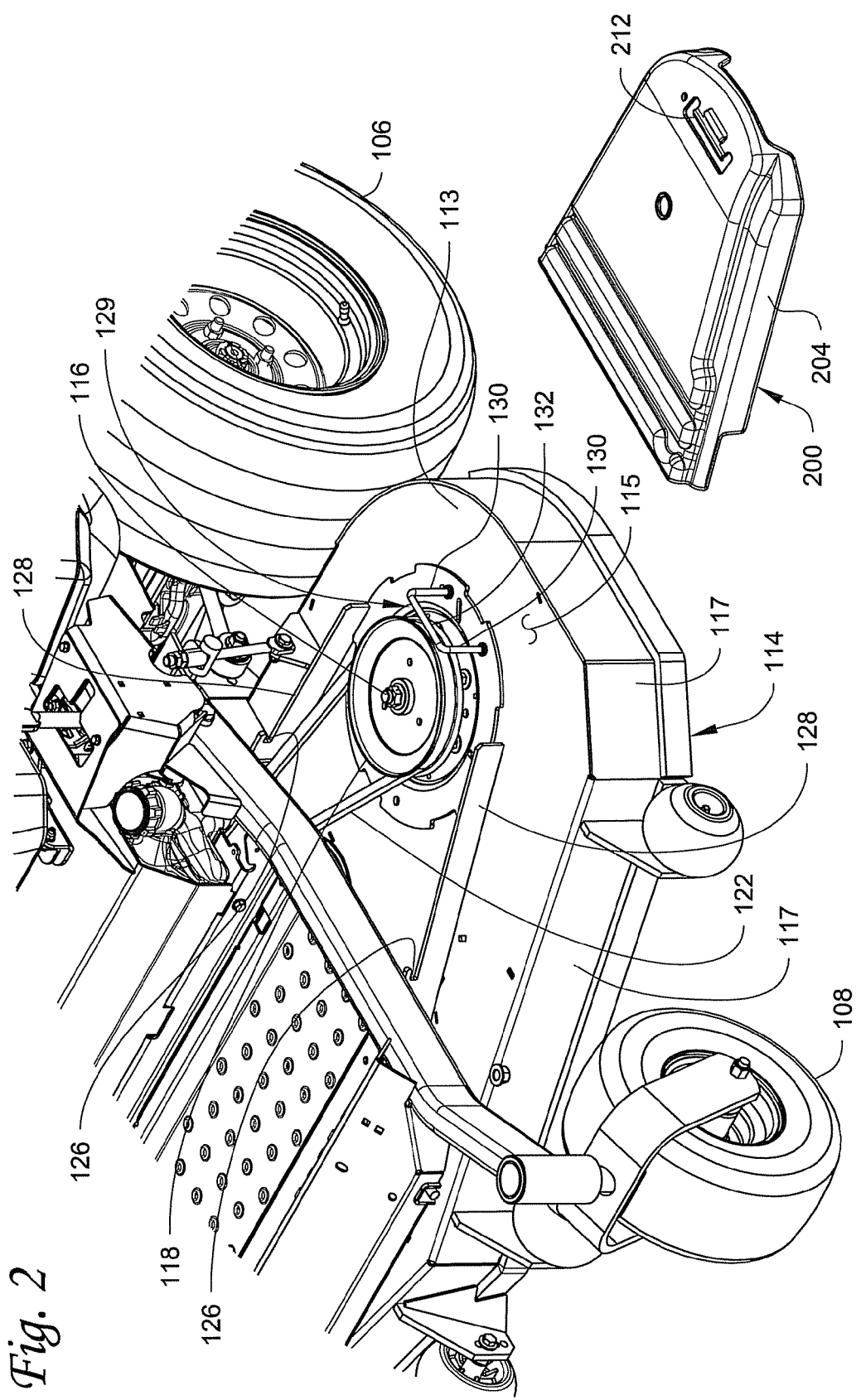
FIG. 2 is an enlarged view of a portion of the cutting deck of FIG. 1, the cutting deck shown with the belt cover in a detached position, e.g., detached from the deck.

As shown in FIG. 2, the rotating pulley 118 and moving belt 122 may be positioned above the upper surface 115 of the deck 114. To shield these moving components from the surrounding environment, one or more removable pulley/belt covers 200 in accordance with embodiments of the present invention may be provided. As FIG. 1 illustrates, each cover 200 may be positioned to cover or surround otherwise exposed portions of the pulley 118 and belt 122 to physically isolate or conceal the same.

Figure 3:
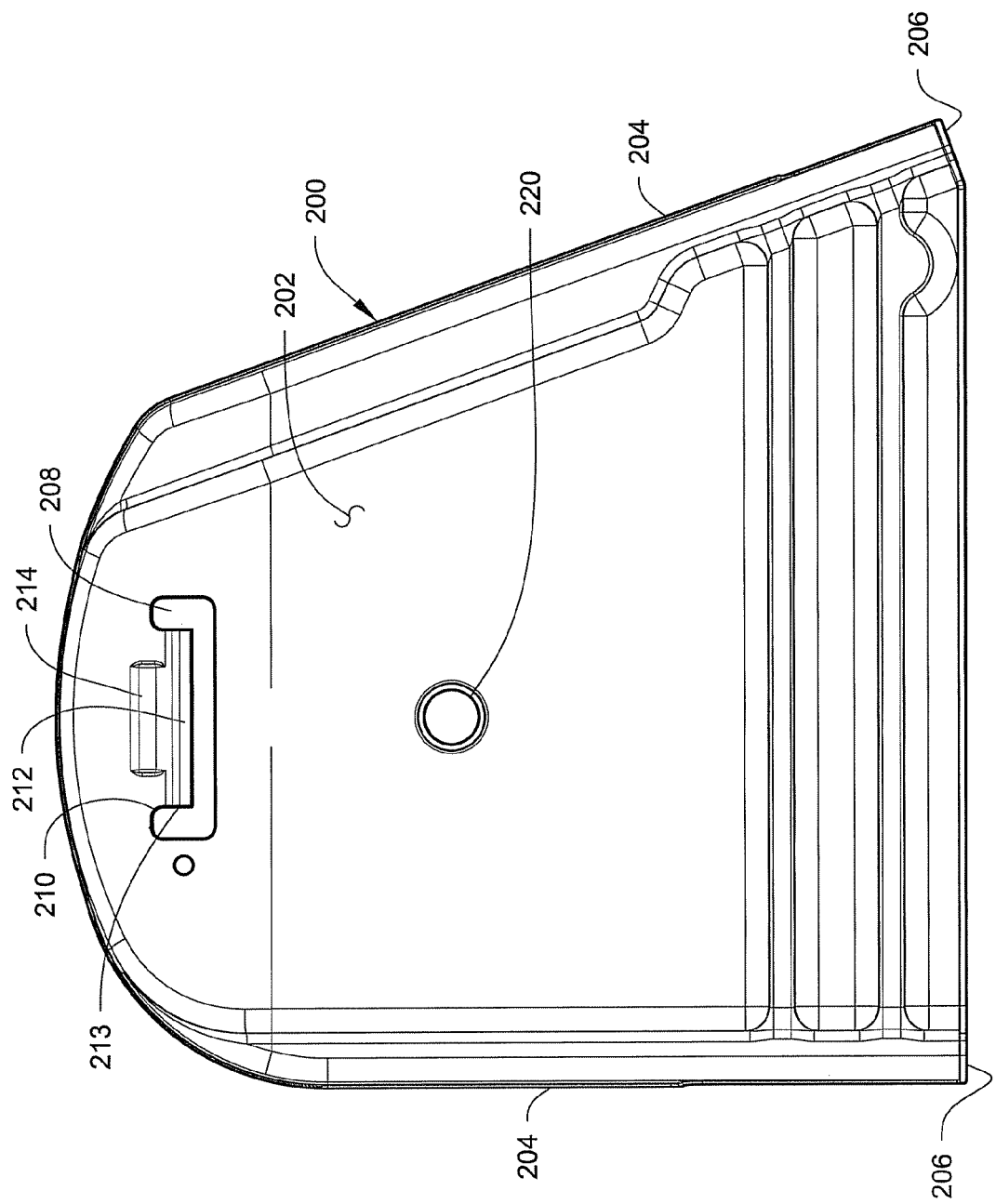
FIG. 3 is a top plan view of the belt cover of FIGS. 1 and 2.

FIG. 3 illustrates a top plan view of the exemplary cover 200. In one embodiment, the cover is made from a resilient material such as plastic (e.g., thermoplastic polyolefin or similar material, although any other resilient materials including, for example, metal or hard rubber are also contemplated). The cover may be a unitary member that includes a face surface, e.g., an upper surface 202, and optionally one or more side skirts 204 (see also FIG. 4) that extend away (e.g., orthogonally or downwardly) from the upper surface of the cover towards the upper surface 115 of the cutting deck 114 (when the cover is installed as shown in FIG. 1). As illustrated in the figures, the cover may incorporate various aesthetic (e.g., surface finish) and structural features (e.g., ribs, steps, etc.) to provide the cover with the desired appearance and structural (e.g., stiffness) characteristics. While described herein as a generally horizontally mounted cover, those of skill in the art will recognize that covers in accordance with embodiments of the present invention may be utilized in applications having most any orientation.

The cover 200 may, in one embodiment, include one or more contact portions, e.g., tabs 206, configured to engage receiving portions, e.g., slots 126, formed in the housing 113, e.g., in optional rails 128 formed on the housing, of the cutting deck 114 (see FIG. 4) when the cover is in a secured position relative to the housing. In the illustrated embodiment, the slots 126 may be formed on the rails 128, which extend vertically upward from the upper surface 115 of the deck 114. The rails may, among other uses, support the cover during installation as well as when it is in the secured position (although, in the illustrated embodiment, the upper surface 115 of the deck 114, rather than the rails 128, supports the cover via contact with the side skirts 204). The rails 128 may also assist in protecting the cover 200 from damage if, for example, a person inadvertently steps on the outer edge of the cover. While described herein as incorporating tabs 206 on the cover 200 and receiving slots 126 on the rails 128 of the housing, such a configuration is not limiting. For instance, reversal of the location of the tabs and slots, or utilization of other engaging features, is certainly possible without departing from the scope of the invention. Similarly, while described with side skirts 204, other embodiments may utilize a generally flat cover (e.g., one without side skirts) that engages tabs formed directly on the upper surface 115 of the deck 114.

Figure 4:
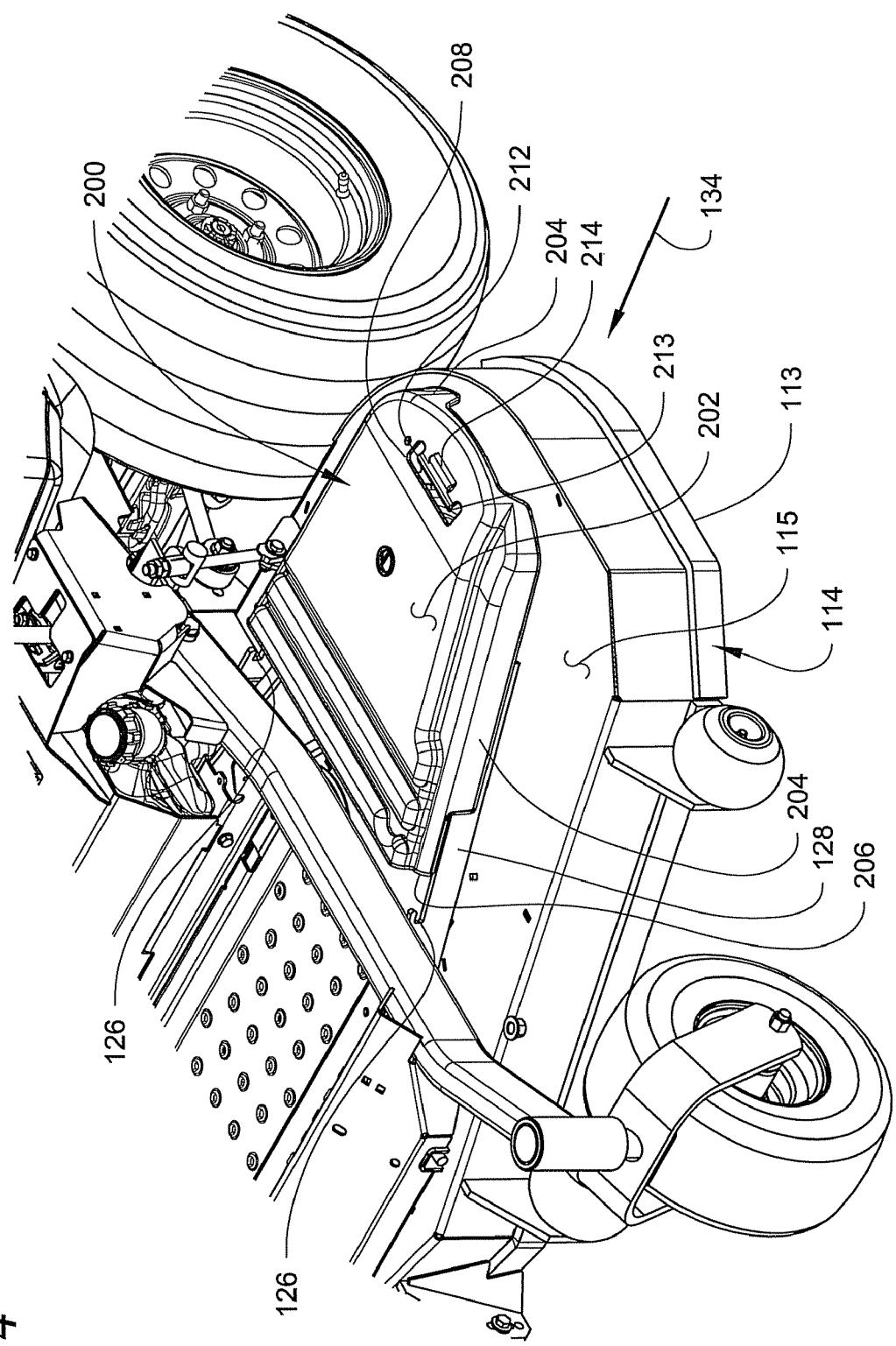
FIG. 4 is an enlarged view of a portion of the cutting deck of FIG. 1 with the belt cover shown during installation, e.g., shown in an intermediate position between the detached and secured positions.

The tabs 206 may be positioned at or near a first (e.g., inner) end of the cover. At or near a second opposite (e.g., outer) end of the cover, an opening 208 passing through the face or upper surface 202 of the cover may be provided. An edge 210 of the opening 208 may define a resilient lip 212. For reasons that will become apparent, the opening may, in one embodiment, be U-shaped as generally illustrated in FIGS. 3 and 4. The U-shaped opening advantageously results in the formation of a cantilevered portion 213 (see also FIG. 7) of the cover extending into the opening 208 and upon which the lip 212 may be located. While described and illustrated as U-shaped, other embodiments may incorporate openings of most any configuration (e.g., V-shaped, circular, oval, etc.) without departing from the scope of the invention.

The opening 208 may be configured to interact with an anchor 129 attached to the housing 113 of the cutting deck 114 as shown in FIG. 2. In one embodiment, the anchor includes two parallel legs 130 each attached to the upper surface 115 of the housing. The legs 130, which may extend perpendicular from the upper surface 115, may be joined at or near their respective upper ends by a cross member 132 that is offset or spaced-apart from the upper surface 115. When configured in this manner, the anchor 129 may form a U-shaped member as shown in, for example, FIG. 2. To attach the anchor 129 to the housing 113 of the deck, the lower ends of the parallel legs 130 may be threaded to receive a fastener (not shown) from beneath the upper surface 115. In other embodiments, the anchor could be welded to the deck. In still other embodiments, the anchor may do away with one or both legs, e.g., it could form a T-shaped member, without departing from the scope of the invention. In yet another embodiment, the portion of the housing to be covered may be recessed. In such an embodiment, the anchor could be configured merely as a member that spans across a portion of the recessed housing, negating the need for any legs 130.

Figure 5:
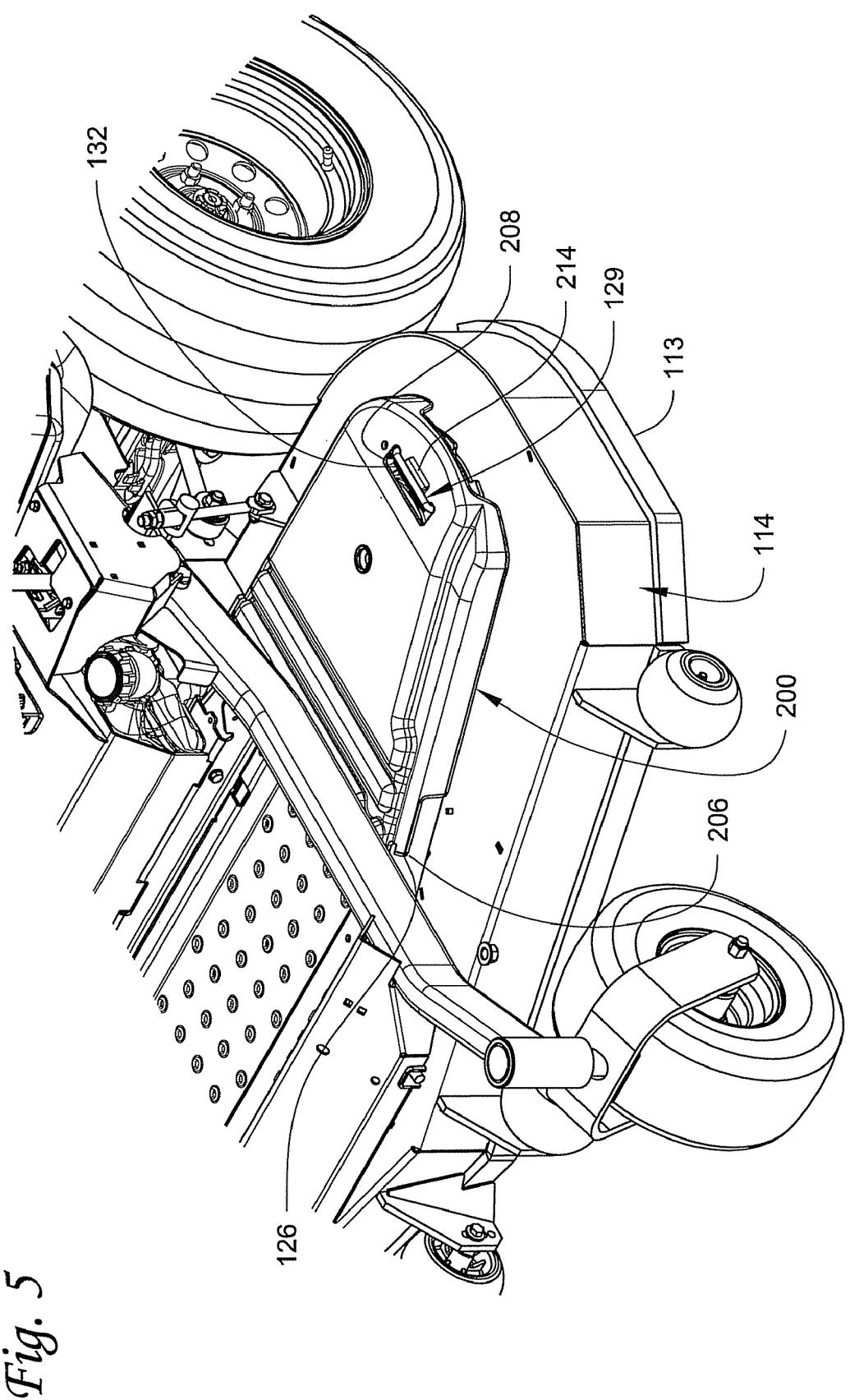
FIG. 5 is an enlarged view of a portion of the cutting deck of FIG. 1 with the belt cover shown fully attached, e.g., in the secured position.

FIGS. 4 and 5 illustrate attachment of the cover 200 to the housing 113 of the deck 114 in accordance with one embodiment of the invention. Starting from the detached position of FIG. 2, the cover 200 may be placed near the upper surface 115 of the deck 114 (see, e.g., FIG. 4) such that it ultimately rests upon the upper surface of the deck (or alternatively, upon the rails 128). The cover may then be pushed inwardly, e.g., in the direction 134. As the cover moves further inwardly, the tabs 206 may be received in the corresponding receiving slots 126 of the rails as also shown in FIG. 5.

Figure 6:
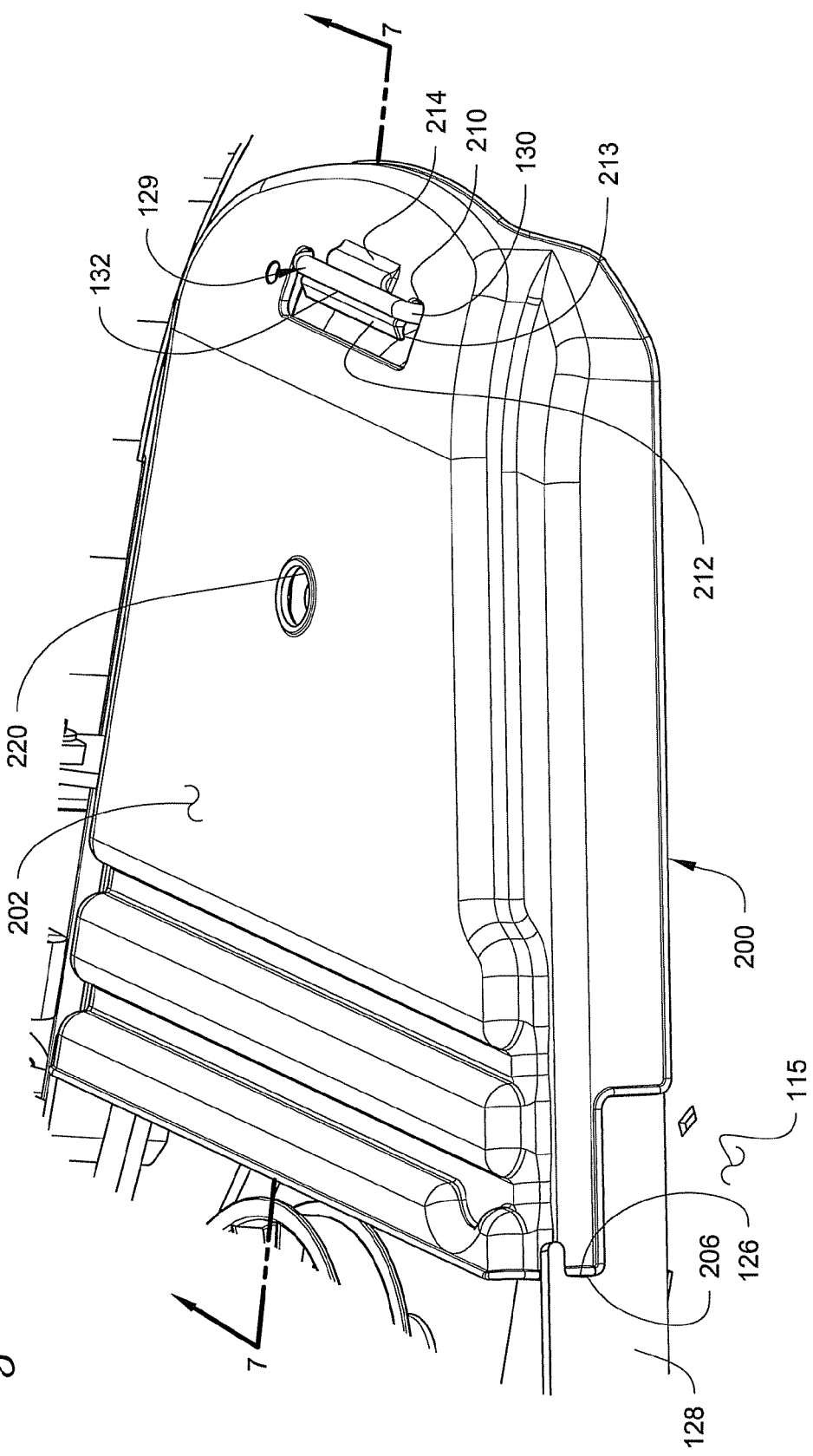
FIG. 6 is an enlarged perspective view of the belt cover of FIG. 5.

Once sufficiently slid inwardly, the anchor 129 may eventually align with the opening 208 such that the cross member 132 may pass (from beneath the cover) through the opening so that it extends slightly above the cover as best shown in FIG. 5. At this point, a bottom edge of the skirt 204 of the cover 200 may rest upon the upper surface 115 of the deck 114. Ultimately, further inward movement of the cover may cause the lip 212 (see FIG. 4) to slide beneath and past the cross member 132 of the anchor 129 and between the legs 130. As the lip 212 moves beneath the cross member 132, the lip, which is located upon the cantilevered portion 213 extending from the outer edge 210 of the opening, may resiliently deflect. When the cover reaches the desired position, the lip 212 may move to the inside of the cross member 132 such that it may return to an undeflected or slightly deflected position as shown in FIG. 6 and interlock with the anchor. Thus, the lip 212 may provide a detent feature to indicate that the cover has reached the fully installed or secured position.

In one embodiment, the upper surface 202, e.g., the cantilevered portion 213, of the cover 200 may also include a stop surface 214 as shown in FIGS. 3, 5, 6, and 7. The lip 212 and stop surface 214 may together restrain movement of the cover (when the cover is in the secured position) relative to the anchor by limiting both inboard and outboard lateral movement of the cover relative to the deck. In the illustrated embodiment, this is accomplished by defining a region, e.g., a valley, between the lip and stop surface in which the cross member may be received and nest when the cover is in the secured position.

FIG. 6 illustrates a perspective view of the cover 200 in the secured position on the deck. As shown in this view, the tabs 206 may be positively engaged with the slots 126 (only front tab and slot are visible but the rear tab and slot are similarly engaged) and the anchor 129 engaged with the lip 212 of the opening 208. FIG. 6 also illustrates how the lip 212 and stop surface 214 may contact the anchor 129 to constrain cover movement. By providing an anchor 129 that protrudes through the cover as shown and described, the anchor may assist in protecting the cover 200 from inadvertent loading. For instance, in the event that a distributed load is applied to the cover 200 in the vicinity of the anchor, the load may be at least be partly supported by the anchor itself.

FIG. 7 illustrates a section view taken along line 7-7 of FIG. 6 (e.g., taken along a plane perpendicular to a longitudinal axis of the mower and passing through the spindle 116). In this view, the position of the anchor, e.g., cross member 132, relative to the lip 212 and stop surface 214 is clearly illustrated. Moreover, the location of the cover 200 relative to the deck 114, pulley 118, and belt 122 is also shown. As clearly illustrated in this view, the cover 200 may include an optional second hole or opening 220 that, when the cover is in the secured position, aligns with (or is otherwise near) the spindle 116. The opening 220 may be used, for example, to provide a visual indication of spindle 116 (and thus blade 120) movement.

During mower 100 operation, debris such as grass clippings may accumulate beneath the cover 200. As the volume of debris increases, operation of the belt 122 and pulley 118 may degrade. Accordingly, it may be beneficial to periodically clean the area beneath the cover. In the illustrated embodiment, the cover may be removed, after power to the deck is stopped, by application of a downward force (e.g., in the direction 216 as shown in FIG. 7) to the lip 212 of the cover 200. As the downward force is applied, the cantilevered portion 213 deflects and the cover 200 may be slid outwardly as indicated by the arrow 218. As the cover moves outwardly, the cross member 132 may again pass through the hole 208 to the lower side of the cover 200. Further movement of the cover outwardly may disengage the tabs 206 from the slots 126 (see FIG. 6) such that the cover is released from the deck, allowing access to the area surrounding the pulley 118 and belt 122.

In another embodiment, the cover 200 may be configured for removal merely by application of an outward force to the cover. That is, the resilient lip 212 may be shaped to provide a ramp or camming surface that will sufficiently deflect the cantilevered portion 213 and ride under the cross member 132 when subjected to an outwardly directed force. In such a configuration, the cover may be removed by grabbing an edge, e.g., an inner or outer edge, of the cover and pulling/pushing the cover outwardly, e.g., in the direction 218.

Covers (and implements incorporating the same) in accordance with embodiments of the present invention may permit simplified attachment and removal of the cover from a structure without reliance on separate fasteners and/or tools. Accordingly, removal and re-attachment of the cover may be quickly accomplished without concern for loss of hardware.

Illustrative embodiments of this invention are discussed and reference has been made to possible variations within the scope of this invention. These and other variations, combinations, and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof.

What is claimed is:

1. A lawn mower cutting deck, comprising:
   a housing;
   a shaft extending through the housing and journalled thereto for rotation of the shaft relative to the housing;
   a coupler attached to an upper end of the shaft;
   a cutting blade attached to a lower end of the shaft;
   a mechanical drive member connected to the coupler;
   an anchor attached to an upper surface of the housing; and
   a removable cover that, when in a secured position, attaches to the housing to shield the coupler and at least a portion of the mechanical drive member, the cover comprising:
   one or more tabs proximate a first end of the cover, each of the one or more tabs configured to be received in a receiving slot formed in the housing; and
   a resilient lip defined by a cantilevered portion of the cover that extends into an opening formed through the cover proximate a second end of the cover, the lip configured to selectively interlock with the anchor when each of the one or more tabs is received in its corresponding receiving slot.

2. The deck of claim 1, wherein the anchor comprises two parallel legs joined by a cross member, the cross member spaced-apart from the upper surface of the deck.

3. The deck of claim 2, wherein the resilient lip slides beneath the cross member of the anchor during movement of the cover to the secured position.

4. The deck of claim 1, wherein the cover is constructed of a material comprising plastic.

5. The deck of claim 1, wherein the deck further comprises a rail extending upwardly from the upper surface of the housing.

6. The deck of claim 5, wherein the receiving slot is formed in the rail.

7. The deck of claim 1, wherein the cover comprises a face surface and one or more side skirts extending away from the face surface.

8. The deck of claim 1, wherein the cantilevered portion further comprises a stop surface, the stop surface and the lip configured to restrain the cover from movement relative to the anchor when the cover is in the secured position.

9. A lawn mower cutting deck, comprising:
   a housing;
   an anchor attached to an upper surface of the housing;
   a shaft extending through the housing and journalled thereto for rotation of the shaft relative to the housing;
   a pulley attached to an upper end of the shaft;
   a cutting blade attached to a lower end of the shaft;
   an endless belt routed around the pulley; and
   a removable cover that, when in a secured position, attaches to the housing to shield the pulley and at least a portion of the belt, the cover comprising:
   one or more portions proximate a first end of the cover, the one or more portions configured to engage corresponding receiving portions of the housing; and
   a resilient lip defined by a cantilevered portion of the cover extending into an opening formed in the cover proximate a second end of the cover, the lip configured to selectively interlock with the anchor when the one or more portions of the cover are engaged with the receiving portions of the housing.

10. The deck of claim 9, wherein the anchor comprises a cross member offset from the upper surface of the deck.

11. The deck of claim 9, wherein the housing further comprises a rail extending upwardly from the upper surface of the housing.

12. The deck of claim 9, wherein the cantilevered portion of the cover further comprises a stop surface.

13. The deck of claim 12, wherein a valley is defined between the stop surface and the lip, the valley configured to receive the anchor when the cover is in the secured position.

* * * * *